United States Patent
Bucheru

(10) Patent No.: US 12,026,317 B2
(45) Date of Patent: Jul. 2, 2024

(54) ELECTRONIC DEVICES WITH AIR INPUT SENSORS

(71) Applicant: Apple Inc., Cupertino, CA (US)

(72) Inventor: Bogdan T. Bucheru, Lakeway, TX (US)

(73) Assignee: Apple Inc., Cupertino, CA (US)

( * ) Notice: Subject to any disclaimer, the term of this patent is extended or adjusted under 35 U.S.C. 154(b) by 132 days.

(21) Appl. No.: 17/477,286

(22) Filed: Sep. 16, 2021

(65) Prior Publication Data

US 2023/0081556 A1   Mar. 16, 2023

(51) Int. Cl.
| | |
|---|---|
| *G06F 3/01* | (2006.01) |
| *G01F 1/66* | (2022.01) |
| *G01N 29/024* | (2006.01) |
| *G01N 29/34* | (2006.01) |
| *G01N 29/36* | (2006.01) |

(Continued)

(52) U.S. Cl.
CPC ............. *G06F 3/017* (2013.01); *G01F 1/662* (2013.01); *G01N 29/024* (2013.01); *G01N 29/341* (2013.01); *G01N 29/36* (2013.01); *G01N 29/4409* (2013.01); *G06F 1/1616* (2013.01); *G06F 3/0346* (2013.01); *G06F 3/0416* (2013.01); *G06F 3/043* (2013.01); *G06F 3/04883* (2013.01); *G01N 29/223* (2013.01); *G01N 29/27* (2013.01); *G01N 29/44* (2013.01);

(Continued)

(58) Field of Classification Search
CPC .... G01N 29/341; G01N 29/024; G01N 29/36; G01N 29/4409; G01N 29/223; G01N 29/27; G01N 29/44; G01F 1/662; G06F 1/1616; G06F 3/017; G06F 3/0346; G06F 3/0416; G06F 3/043; G06F 3/04883; G06F 3/0412; G06F 3/04166
See application file for complete search history.

(56) References Cited

U.S. PATENT DOCUMENTS

| | | | |
|---|---|---|---|
| 9,377,860 B1 | 6/2016 | Weber et al. | |
| 9,519,365 B2 | 12/2016 | Hitosuga | |

(Continued)

FOREIGN PATENT DOCUMENTS

| | | | | |
|---|---|---|---|---|
| WO | WO-2014161276 A1 | * | 10/2014 | ............. G06F 3/043 |
| WO | WO-2014161775 A1 | * | 10/2014 | ........... G06F 1/1643 |

OTHER PUBLICATIONS

U.S. Appl. No. 15/866,778, filed Jan. 10, 2018.

*Primary Examiner* — Benjamin R Schmitt
(74) *Attorney, Agent, or Firm* — Treyz Law Group, P.C.; Kendall P. Woodruff

(57) ABSTRACT

An electronic device includes air input sensors that gather air input from a user's fingers, a stylus, or other object in a volume of air near the electronic device. The air input sensors include ultrasonic transducers that emit ultrasonic signals towards the volume of air and that detect the ultrasonic signals after the signals reflect from the external object. Using time-of-flight measurement techniques, control circuitry tracks the movement of the external object in the volume of air near the electronic device. A display provides visual feedback of the air input, such as shadows that preview where the input will be directed to on the display. The volume of air where input is detected is divided into multiple input zones that trigger different actions from the electronic device. The ultrasonic transducers include acoustic lenses.

15 Claims, 7 Drawing Sheets

(51) Int. Cl.
*G01N 29/44* (2006.01)
*G06F 1/16* (2006.01)
*G06F 3/0346* (2013.01)
*G06F 3/041* (2006.01)
*G06F 3/043* (2006.01)
*G06F 3/04883* (2022.01)
*G01N 29/22* (2006.01)
*G01N 29/27* (2006.01)

(52) U.S. Cl.
CPC ........ *G06F 3/0412* (2013.01); *G06F 3/04166* (2019.05)

(56) References Cited

U.S. PATENT DOCUMENTS

| | | |
|---|---|---|
| 10,061,396 B1 | 8/2018 | Shibayama et al. |
| 10,175,721 B2 | 1/2019 | Sun et al. |
| 10,534,479 B2 | 1/2020 | Holmgren et al. |
| 10,921,854 B2 | 2/2021 | Garelli et al. |
| 2006/0161871 A1* | 7/2006 | Hotelling ............. G06F 3/0485 715/862 |
| 2008/0158172 A1 | 7/2008 | Hotelling et al. |
| 2009/0228841 A1 | 9/2009 | Hildreth |
| 2010/0026656 A1 | 2/2010 | Hotelling et al. |
| 2011/0193818 A1* | 8/2011 | Chen ...................... G06F 3/041 345/173 |
| 2011/0205186 A1 | 8/2011 | Newton et al. |
| 2011/0289456 A1 | 11/2011 | Reville et al. |
| 2011/0310005 A1* | 12/2011 | Chen ..................... G06F 1/3262 345/156 |
| 2014/0267130 A1 | 9/2014 | Hwang et al. |
| 2014/0347296 A1 | 11/2014 | Yoshikawa |
| 2015/0062069 A1 | 3/2015 | Shin et al. |
| 2015/0130742 A1 | 5/2015 | Chen et al. |
| 2015/0130764 A1 | 5/2015 | Woolley et al. |
| 2016/0067602 A1 | 3/2016 | Holmgren et al. |
| 2016/0162146 A1 | 6/2016 | Wu |
| 2017/0090865 A1 | 3/2017 | Armstrong-Muntner et al. |
| 2017/0285843 A1 | 10/2017 | Roberts-Hoffman et al. |
| 2018/0068636 A1 | 3/2018 | Kim et al. |
| 2018/0088632 A1 | 3/2018 | Dreessen et al. |
| 2019/0265828 A1* | 8/2019 | Hauenstein ........... G06F 3/0412 |
| 2019/0369755 A1* | 12/2019 | Roper ................... G06F 3/0481 |
| 2020/0073512 A1 | 3/2020 | Jiang |

* cited by examiner

ELECTRONIC DEVICES WITH AIR INPUT SENSORS

FIELD

This relates generally to electronic devices, and, more particularly, to electronic devices with sensors.

BACKGROUND

Electronic devices such as laptop computers and other electronic devices include input devices such as keyboards, touch pads, and touch sensitive displays. Using these input devices, users can control the operation of the electronic devices.

It can be challenging to operate electronic devices using certain input devices. For example, some input devices are only configured to detect touch input on a two-dimensional surface. This may overly limit the types of input that a user can provide to an electronic device.

SUMMARY

An electronic device may include air input sensors that gather air input from a user. The air input may be input from a user's fingers, a stylus, or other object in a volume of air near the electronic device. The air input sensors may include ultrasonic transducers that emit ultrasonic signals towards the volume of air and that detect the ultrasonic signals after the signals reflect from the external object. Using time-of-flight measurement techniques, control circuitry may track the movement of the external object in the volume of air near the electronic device.

A display may display visual feedback of the air input, such as shadows that preview where the input will be directed to on the display. The volume of air where input is detected may be divided into multiple input zones that trigger different actions from the electronic device. The ultrasonic transducers may include acoustic lenses to focus sound onto the transducers and/or to diverge a sound signal across a given range of angles.

DETAILED DESCRIPTION

To enhance the ability of a user to operate an electronic device, the electronic device may be provided with air input sensors. The air input sensors may detect the presence of external objects such as a user's fingers, a stylus, or other object, without direct contact between the objects and the air input sensors. For example, air gestures with the user's hands and/or movements of a stylus or pen in the air above and/or adjacent to the electronic device may be used to control the electronic device.

Figure 1:
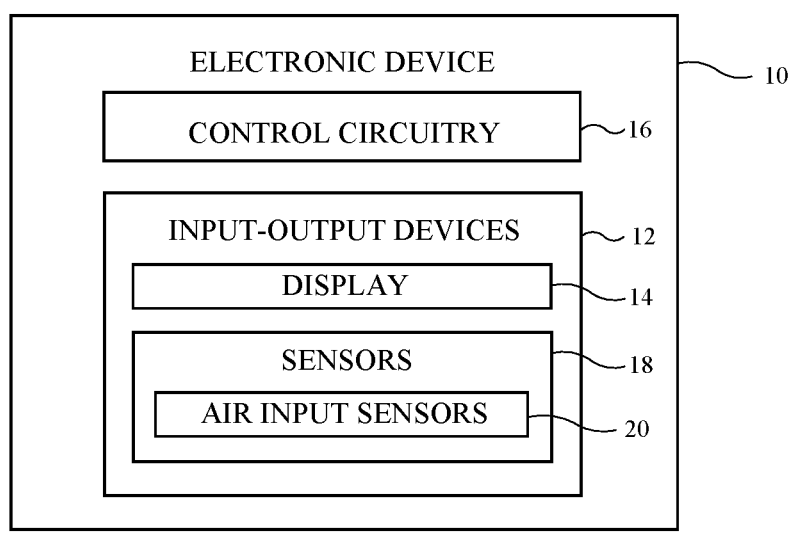
FIG. 1 is a schematic diagram of an illustrative electronic device with air input sensors in accordance with an embodiment.

An illustrative electronic device of the type that may be provided with air input sensors is shown in FIG. 1. Electronic device 10 may be a computing device such as a laptop computer, a computer monitor containing an embedded computer, a tablet computer, a cellular telephone, a media player, or other handheld or portable electronic device, a smaller device such as a wrist-watch device, a pendant device, a headphone or earpiece device, a device embedded in eyeglasses or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, equipment that implements the functionality of two or more of these devices, or other electronic equipment. Illustrative configurations in which a sensing strip such as an air gesture sensing strip is incorporated into an electronic device such as a laptop computer may sometimes be described herein as an example.

As shown in FIG. 1, electronic device 10 may have control circuitry 16. Control circuitry 16 may include storage and processing circuitry for supporting the operation of device 10. The storage and processing circuitry may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in control circuitry 16 may be used to control the operation of device 10. The processing circuitry may be based on one or more microprocessors, microcontrollers, digital signal processors, baseband processors, power management units, audio chips, application specific integrated circuits, etc.

Input-output circuitry in device 10 such as input-output devices 12 may be used to allow data to be supplied to device 10 and to allow data to be provided from device 10 to external devices. Input-output devices 12 may include buttons, joysticks, scrolling wheels, touch pads, key pads, keyboards, microphones, speakers, tone generators, vibrators and other haptic output devices, sensors with digital image sensors such as visible light cameras and other sensors, light-emitting diodes and other status indicators, data ports, etc. A user can control the operation of device 10 by supplying commands through input-output devices 12 and may receive status information and other output from device 10 using the output resources of input-output devices 12.

Input-output devices 12 may include one or more displays such as display 14. Display 14 may be an organic light-emitting diode display, a liquid crystal display, or other display. Display 14 may be a touch screen display that includes a touch sensor for gathering touch input from a user or display 14 may be a touch insensitive display that is not sensitive to touch. A touch sensor for display 14 may be based on an array of capacitive touch sensor electrodes, acoustic touch sensor structures, resistive touch components, force-based touch sensor structures, a light-based touch sensor, or other suitable touch sensor arrangements.

Input-output devices 12 may also include sensors 18. Sensors 18 may include microphones, force sensors, touch sensors, temperature sensors, air pressure sensors, moisture sensors, ambient light sensors and other light-based sensors, magnetic sensors, sensors for measuring movement of device 10 along a surface (e.g., a light source such as a light-emitting diode and/or laser diode and a corresponding visible light or infrared camera that captures images of a portion of work surface under device 10 as device 10 is moved across the work surface, device position (movement) sensors based on rotating wheels that track surface movements, etc.), image sensors for such as visible-light and infrared cameras (e.g., digital image sensors and lenses for measuring three-dimensional hand gestures and other user gestures, etc.), grip sensors (e.g., capacitance-based grip sensors, optical grip sensors, etc.), and/or other sensors. If desired, sensors 18 may include sensors for measuring the orientation, movement, and/or position of device 10 such as inertial measurement units that include accelerometers, compasses, and/or gyroscopes. An accelerometer may be used to measure vibrations that pass to device 10 through a tabletop or other surface from a user's fingers.

As shown in FIG. 1, sensors 18 may include air input sensors 20 (sometimes referred to as non-contact input sensors). Air input sensors 20 may be configured to monitor the position of one or more external objects (e.g., a user's hands, one or more of a user's fingers, a stylus, and/or other suitable external object) in the air near device 10. Air input sensors 20 may be based on optical sensing, ultrasonic sensing, radio-frequency sensing, capacitive sensing, and/or other suitable sensing technologies.

During operation, control circuitry 16 may use air input sensors 20 to gather user input in the air above, in front of, behind, or otherwise adjacent to electronic device 10. The user input may include three-dimensional gestures (e.g., hand gestures made in the air without necessarily contacting device 10), stylus input (e.g., stylus input in the air without necessarily contacting device 10), and/or other user input. Control circuitry 16 may, for example, use sensors 20 to gather information such as information on the position of a user's finger(s), stylus, or other object in a three-dimensional volume of air near device 10. This additional user input may help extend the input capabilities of device 10 and may thereby supplement the information gathered using buttons, touch sensors, trackpads, keyboards, pointing device movement sensors, and/or other input devices in device 10. User input may be used in manipulating visual objects on display 14 (e.g., display icons, etc.), may be used in providing drawing input to display 14, may be used in supplying device 10 with text, may be used in making menu selections, and/or may otherwise be used in operating device 10.

Figure 2:
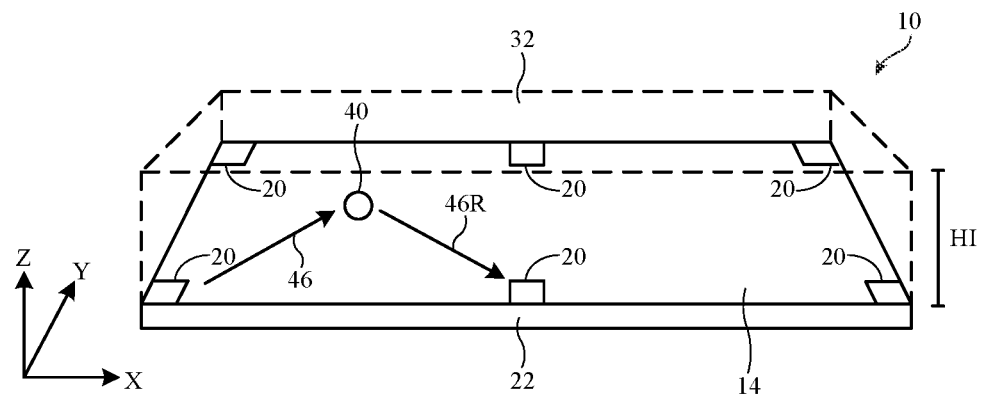
FIG. 2 is a perspective view of an illustrative electronic device such as a cellular telephone, tablet computer, or other electronic device with air input sensors in accordance with an embodiment.

A perspective view of an illustrative electronic device that includes air input sensors 20 is shown in FIG. 2. In the example of FIG. 2, device 10 is a portable electronic device such as a cellular telephone, a tablet computer, or other suitable electronic device. Device 10 may have opposing front and rear faces. A display such as display 14 may be mounted on the front face of device 10 and housing 22 may have a rear housing wall that covers the opposing rear face of device 10. Display 14 may be a touch-sensitive display that includes a touch sensor or display 14 may be touch-insensitive. Housing 22 may include one or more walls or other support structures and may be formed from metal, polymer, glass, ceramic, crystalline material such as sapphire, fabric, natural materials such as wood, and/or other materials.

As shown in FIG. 2, device 10 may include one or more air input sensors 20 supported by housing 22. Air input sensors 20 may serve as position monitoring sensors that track the position of external objects such as external object 40. Object 40 may be part of a user's body (e.g., hand, finger, etc.), may be a stylus or other input device, may be an object without electronics such as a pen or paintbrush, and/or may be any other suitable object. Arrangements in which external object 40 is one or more fingers of a user may sometimes be described herein as an illustrative example.

Air input sensors 20 may be placed in any suitable location on device 10 depending on the desired input region. In the example of FIG. 2, air input sensors 20 detect air input in input region 32 which is a volume of air occupying the space above the front face of device 10 (e.g., above display 14). For an input region in this area, air input sensors 20 may be mounted on the front face of device 10 (e.g., at the periphery of display 14). Air input sensors 20 may, for example, be mounted at the corners of display 14, along one or more sides of display 14, and/or in display 14 (e.g., behind a pixel array in display 14, within the pixel array of display 14, in the inactive area or active area of display 14, etc.). Arrangements in which air input sensors 20 are mounted to a surface of device 10 that does not include a display and/or that does not include a touch sensor may also be used. There may be any suitable number of air input sensors 20 in device 10 (e.g., one, two, three, four, five, six, more than six, more than ten, less than ten, more than twenty, less than twenty, etc.). Air input sensors 20 may be mounted in other locations of device 10 to form input regions 32 in other volumes of air near device 10, if desired. For example, air input sensors 20 may be mounted to a sidewall of device 10 to detect air input in a volume of air that is adjacent to device 10 (i.e., a volume of air that does not necessarily overlap display 14 in the z-direction of FIG. 2). The input region 32 of FIG. 2 is merely illustrative. In the example of FIG. 2, input region 32 has height H1 in the z-direction of FIG. 2 (e.g., input region 32 has height H1 relative to a surface of device 10 such as the surface of display 14).

Air input sensors 20 may be acoustic sensors (e.g., ultrasonic sensors), capacitive sensors, radio-frequency sensors, optical sensors such as visible light image sensors, infrared image sensors, proximity sensors formed from light-emitting diodes and photodetectors, three-dimensional camera systems such as depth sensors (e.g., structured light sensors and/or depth sensors based on stereo imaging devices that capture three-dimensional images), self-mixing sensors, light detection and ranging (lidar) sensors that gather time-of-flight measurements (e.g., time-of-flight cameras), a combination of two or more of these sensors, and/or other sensors for measuring finger position and/or the position of other objects 40 in input region 32.

As an example, air input sensors 20 may be optical sensor elements that each include a light-emitting diode, laser, or other light emitter (e.g., an infrared light-emitting device) and that include a light detector (e.g., an infrared photodetector). The amount of emitted infrared light that is detected by an infrared photodetector after reflecting from an external object may be used to measure the location of the external object (e.g., a finger) and thereby detect air gestures and/or other air input. Another illustrative arrangement involves using ultrasonic sound emitters to emit ultrasonic signals and using ultrasonic sound detectors (e.g., microphones) to detect reflected acoustic signals and thereby gather information on air gestures and/or other air input. If desired, location measurements may be gathered using radio-frequency sensor elements (radio-frequency emitters and corresponding radio-frequency receivers). Other air input monitoring sensors and/or combinations of these sensors may also be used in forming air input sensors 20. Configurations for air input sensors 20 that use ultrasonic sound emitters and detectors to detect air gestures and/or other air input are sometimes described herein as an illustrative example.

During operation, one or more air input sensors 20 may emit signals such as signal 46 (e.g., an acoustic signal, an optical signal, a radio-frequency signal, and/or other suitable signal) that interacts with object 40 in input region 32. One or more air input sensors 20 may detect reflected signal 46R after it reflects off of object 40 in input region 32. Based on the emitted and detected signals, control circuitry 16 may determine the position (and may therefore track the movement) of object 40 relative to sensors 20. With this arrangement, a user may use input region 32 as a standalone input region and/or as a supplemental input region that supplements other input devices in device 10 such as touch-sensitive display 14. This allows a user to effectively provide input that might be difficult to provide directly to the body of device 10 (e.g., directly to buttons or a touch sensor on housing 22).

As an example, a user may move object 40 in input region 32 to move a cursor on a display such as display 14, to select an item in a list, to highlight an item, to drag and drop items, to launch an item, to provide drawing input (e.g., to draw a line or provide other drawing input), and/or to otherwise interact with device 10. User input in the air (e.g., air input) may include finger taps in the air (single taps, double taps, triple taps, etc.), gestures in the air formed from lingering finger positions (hovers, persistent finger presence in a particular location in region 32), single-finger swipes in the air, multi-finger swipes in the air, pinch-to-zoom gestures in the air, and other multi-touch finger gestures in the air, hand gestures in the air, other two-dimensional and three-dimensional gestures in the air (e.g., waving a user's hand and fingers in the air in region 32, etc.), stylus movements in the air, pen movements in the air, and/or any other suitable user input from a user body part, stylus controlled by a user, and/or other external objects.

Figure 3:
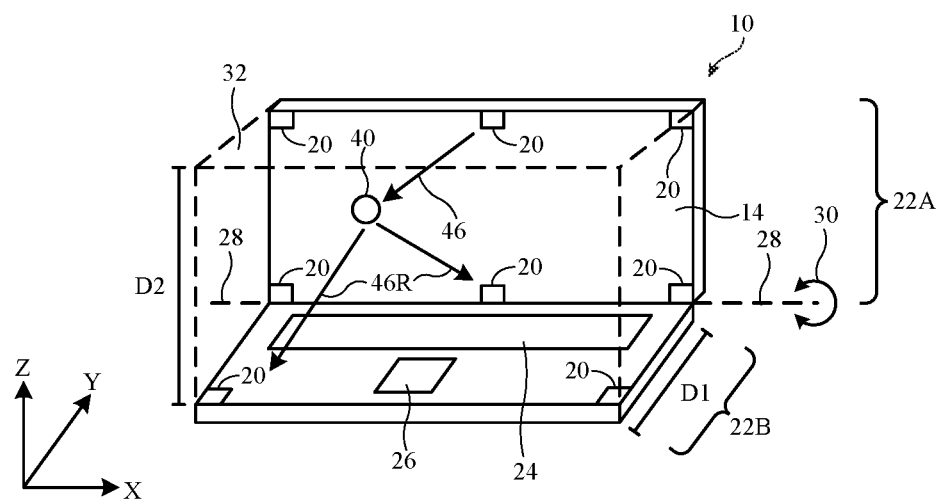
FIG. 3 is a perspective view of an illustrative electronic device such as a laptop or other electronic device with air input sensors in accordance with an embodiment

FIG. 3 is a perspective view of device 10 in an illustrative configuration in which device 10 has portions that can be moved relative to each other (e.g., a configuration in which device 10 is a laptop computer). As shown in FIG. 3, device 10 may have upper housing portion 22A and lower housing portion 22B. Upper housing portion 22A may include an upper portion of housing 22 that supports display 14. Lower housing portion 22B may include a lower portion of housing 22 that supports a two-dimensional touch sensor such as trackpad 26 and that supports a keyboard such as keyboard 24. One or more hinges may be provided to allow upper housing portion 22A to rotate about rotational axis 28 in directions 30 relative to lower housing portion 22B.

Air input sensors 20 may be formed in one or more locations on upper housing 22A and/or one or more locations on lower housing 22B. In the example of FIG. 3, air input sensors 20 are located at the corners and along the sides of display 14 on upper housing 22A and are also located at the corners of lower housing 22B. Sensors 20 may be configured to detect air input in region 32. Input region 32 may be a volume of air in front of display 14, above keyboard 24, and/or above trackpad 26. Input region 32 may be located between upper housing portion 22A and lower housing portion 22B. The precise location of input region 32 may change depending on the position of upper housing 22A relative to lower housing 22B. In the example of FIG. 3, input region 32 has dimension D1 in the y-direction of FIG. 3 and dimension D2 in the z-direction of FIG. 3. Air input sensors 20 may be configured to detect and track movements of external objects in region 32 such as object 40. The example of FIG. 3 in which input region 32 is coextensive with the edges of device 10 is merely illustrative. If desired, input region 32 may overlap only a portion of device 10 (e.g., a region over keyboard 24 or other region) and/or may extend past the edges of device 10.

Figure 4:
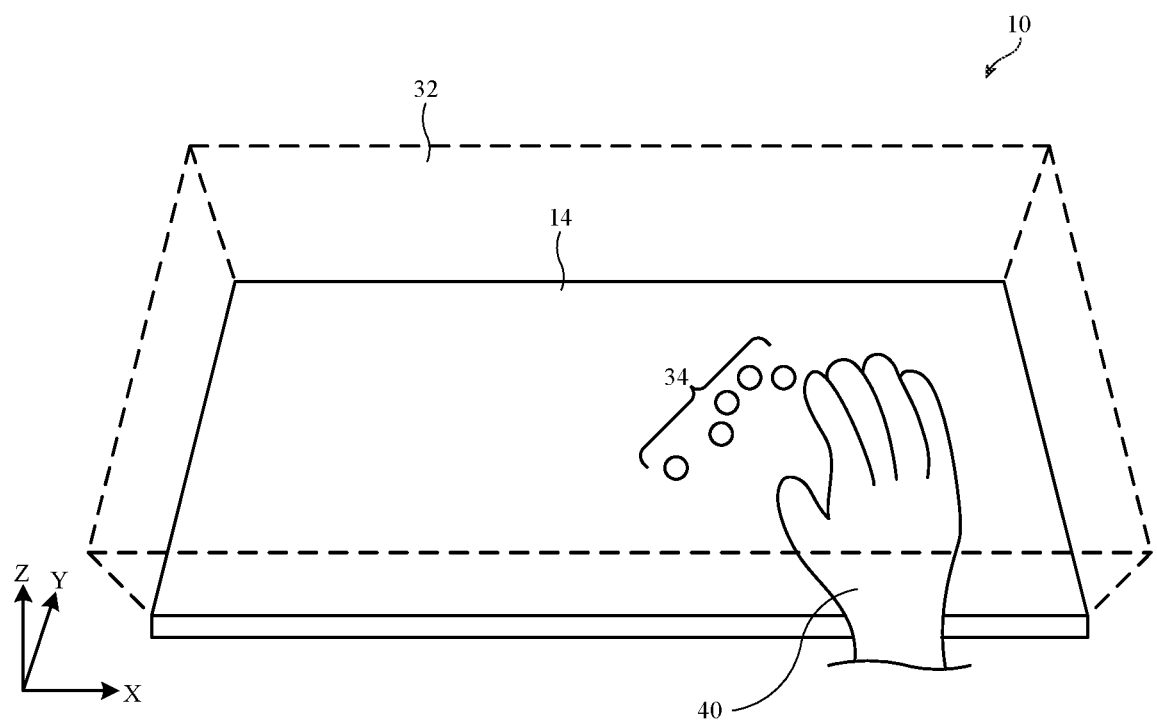
FIG. 4 is a perspective view of an illustrative electronic device with air input sensors and a display that provides visual feedback in response to air input from a user's hands in accordance with an embodiment.

FIG. 4 is a perspective view of device 10 illustrating how visual feedback may be provided to a user while gathering air input with sensors 20. In the example of FIG. 4, object 40 is a user's hand. The user may place his or her hand 40 in input region 32. Control circuitry 16 may use air input sensors 20 to detect and track the movement of the individual fingers on hand 40 and/or may track detect and track the movement of the entire hand 40 in three-dimensional space. While hand 40 is moving in input region 32, control circuitry 16 may provide feedback to the user that is reflective of the input being gathered with air input sensors 20. For example, control circuitry 16 may use visual feedback on display 14, audible feedback using one or more speakers in device 10, haptic feedback using one or more haptic output devices in device 10, and/or other types of feedback using any other suitable output device in device 10.

As shown in FIG. 4, for example, display 14 may display visual elements 34 as visual feedback for the user during air input operations. Visual elements 34 may be displayed images that change based on the position and movements of hand 40. Visual elements 34 may be displayed "shadows" of object 40 (e.g., individual display elements that track movement of individual fingers on hand 40 as detected by sensors 20). This lets the user know where on display 14 the user is providing input to, which may be helpful in air input operations where contact between display 14 and object 40 is not necessarily taking place.

Visual elements 34 may be any suitable display element (e.g., may have any suitable shape, color, shading, etc.). If desired, visual elements 34 may change based on the movement of object 40. For example, movements along the x-y plane of FIG. 4 may result in movements of visual elements 34 across display 14, whereas movements along the z-axis of FIG. 4 may result in a change in one or more visual characteristics of visual elements 34 (without necessarily resulting in movement of visual elements 34 across display 14). A change in one or more characteristics such as opacity, color, shading, and/or shape may result when object 40 moves closer to and/or further away from display 14. For example, when object 40 approaches display 14 from far away, visual elements 34 may initially have a first set of characteristics (e.g., a light shadow in which display elements "behind" visual elements 34 are highly visible). As object 40 gets closer to display 14, the visual elements 34 may change to have a second set of characteristics (e.g., visual elements 34 may darken, making display elements "behind" visual elements 34 less visible). This type of visual feedback may be used to inform the user of different types of input functionality associated with air input at different heights, if desired. For example, air input from further away may result in visual element 34 hovering over an object on display 14, while air input from a closer distance may result in visual element 34 selecting the desired object on display 14. The changing characteristics of visual feedback in elements 34 may help the user interact with display 14 and/or device 10 without requiring contact between the user's hand 40 and device 10. This is merely illustrative, however. Other types of visual feedback and/or other changing characteristics of visual feedback may be used to help the user provide air input to device 10.

Figure 5:
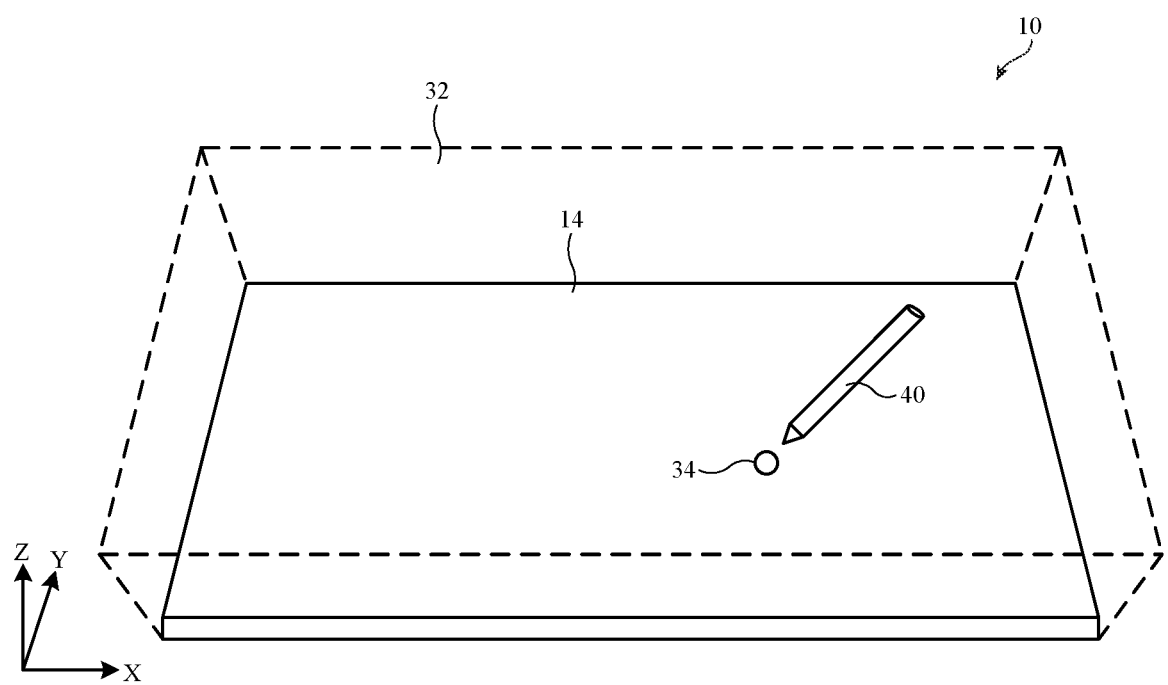
FIG. 5 is a perspective view of an illustrative electronic device with air input sensors and a display that provides visual feedback in response to air input from a stylus in accordance with an embodiment.

FIG. 5 is a perspective view of device 10 illustrating how visual feedback may be provided to a user while gathering air input from a stylus, pen, or other object with sensors 20. As shown in the example of FIG. 5, object 40 is a handheld item such as a stylus or an item without electronics such as a pen, paintbrush, or other item controlled by the user. The user may place item 40 in input region 32. Control circuitry 16 may use air input sensors 20 to detect and track the movement of item 40. While item 40 is moving in input region 32, control circuitry 16 may provide feedback to the user that is reflective of the input being gathered with air input sensors 20. For example, control circuitry 16 may use visual feedback on display 14, audible feedback using one or more speakers in device 10, haptic feedback using one or more haptic output devices in device 10, and/or other types of feedback using any other suitable output device in device 10.

As shown in FIG. 5, for example, display 14 may display visual element 34 as visual feedback for the user while gathering air input from item 40. Visual element 34 may be a displayed image that changes based on the position and movements of item 40. This lets the user know where on display 14 the input from item 40 will be directed to, which may be helpful in air input operations where contact between display 14 and item 40 is not necessarily taking place.

Visual element 34 may be any suitable display element (e.g., may have any suitable shape, color, shading, etc.). If desired, visual element 34 may change based on the movement of item 40. For example, movements along the x-y plane of FIG. 5 may result in movements of visual element 34 across display 14, whereas movements along the z-axis of FIG. 5 may result in a change in one or more visual characteristics of visual element 34 (without necessarily result in movement of visual element 34 across display 14). A change in one or more characteristics such as opacity, color, shading, and/or shape may result when item 40 moves closer to and/or further away from display 14. For example, when item 40 approaches display 14 from far away, visual element 34 may initially have a first set of characteristics (e.g., a light shadow in which display elements "behind" visual element 34 are highly visible). As item 40 gets closer to display 14, visual element 34 may change to have a second set of characteristics (e.g., visual element 34 may darken, making display elements "behind" visual element 34 less visible). This type of visual feedback may be used to inform the user of different types of input functionality associated with air input at different heights, if desired. For example, air input from item 40 from further away may result in visual element 34 providing a "preview" of drawing input on display 14 (e.g., a beginning of a line or other element to be drawn with item 40), while air input from item 40 at a closer distance may result in visual element 34 showing the actual line being drawn on display 14. The changing characteristics of visual feedback from element 34 may help the user interact with display 14 and/or device 10 without requiring contact between item 40 and device 10. This is merely illustrative, however. Other types of visual feedback and/or other changing characteristics of visual feedback may be used to help the user provide air input to device 10.

Air input of the type shown in FIGS. 4 and 5 may be used for interacting with options such as function key options (default and/or customized), applications (e.g., a word processing application, a spreadsheet application, a drawing application, an internet browser, etc.), operating system functions (e.g., instructions to adjust screen brightness, audio volume, etc.), and/or may correspond to other on-screen options. If desired, air input that is detected with air input sensors 20 may be used to adjust the operation of device 10 in the absence of on-screen options. As an example, an air gesture in region 32 may be used to place device 10 in a low-power sleep state without displaying a selectable sleep state option on display 14.

If desired, different air gestures may be used in interacting with options of interest. For example, a finger hovering over a particular location on display 14 may be used to highlight a desired option on display 14, whereas a continued presence (dwell) over that location may be used to activate the highlighted option. This is merely illustrative, however. If desired, an option may be selected by a hover followed by a swipe, an air gesture with two (or more) fingers can be used to select an option, or an air gesture such as an air gesture swipe may be used to move an on-screen object. If desired, a hovering gesture may be used to highlight a desired option followed by a tap or other touch event to select the highlighted option.

Figure 6:
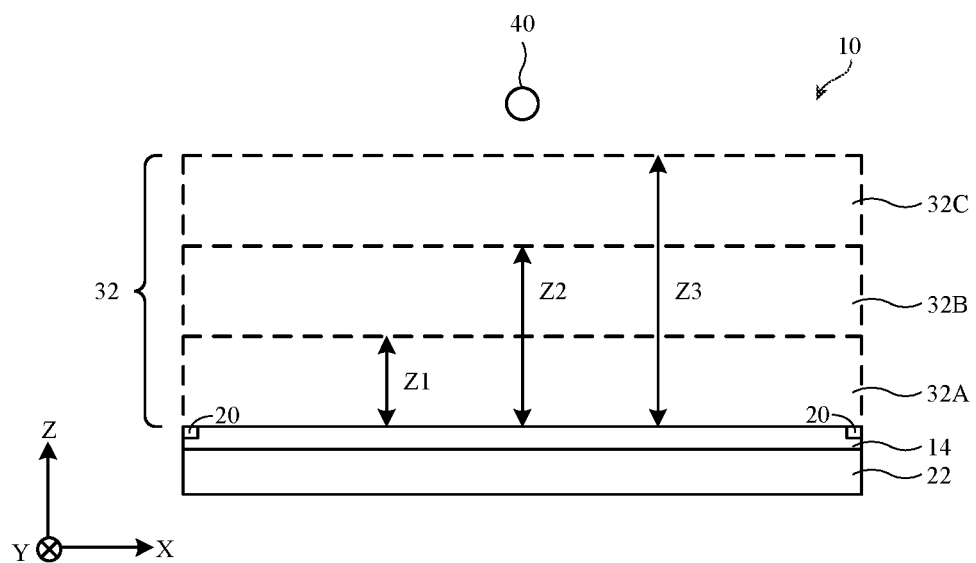
FIG. 6 is a side view of an illustrative electronic device with air input sensors configured to detect air input in different input zones above the electronic device in accordance with an embodiment.

FIG. 6 is a side view of device 10 showing how an air input region may have different input zones. As shown in FIG. 6, input region 32 may include input zones such as input zones 32A, 32B, and 32C. Input zone 32A may include a volume of air directly above display 14, up to height Z1 above display 14. Input zone 32B may include a volume of air between height Z1 and height Z2 above display 14. Input zone 32C may include a volume of air between height Z2 and height Z3 above display 14. Air input detected by air input sensors 20 in the different input zones 32A, 32B, and 32C may correspond to different input functions. In other words, control circuitry 16 may take a first action in response to a given air gesture in zone 32C, may take a second action (e.g., different from the first action) in response to the same air gesture in zone 32B, and may take a third action (e.g., different from the first and second actions) in response to the same air gesture in zone 32C.

As an example, when object 40 is in input zone 32C, control circuitry 16 may perform a first set of actions in response to movements of object 40 such as providing visual feedback on display 14 indicating where the air input is mapping to on display 14 but without actually selecting or manipulating any objects on display 14. When object 40 is in input zone 32B, control circuitry 16 may perform a second set of actions in response to movements of object 40 such as providing visual feedback on display 14 indicating that an object on display 14 has been selected, that a line is being drawn, and/or that other objects on display 14 are being manipulated with the air input being detected in zone 32B. When object 40 is in input zone 32A, control circuitry 16 may perform a third set of actions in response to movements of object 40 such as providing visual feedback on display 14 that includes additional options to interact with items on display 14. This is merely illustrative, however. In general, control circuitry 16 may take any suitable action in response to air input in zones 32A, 32B, and 32C detected by air input sensors 20. If desired, input region 32 may instead or additionally be divided into different zones along the x-axis and/or y-axis of FIG. 6. The example of FIG. 6 in which input region 32 is divided into different zones along the z-axis is merely illustrative.

Figure 7:
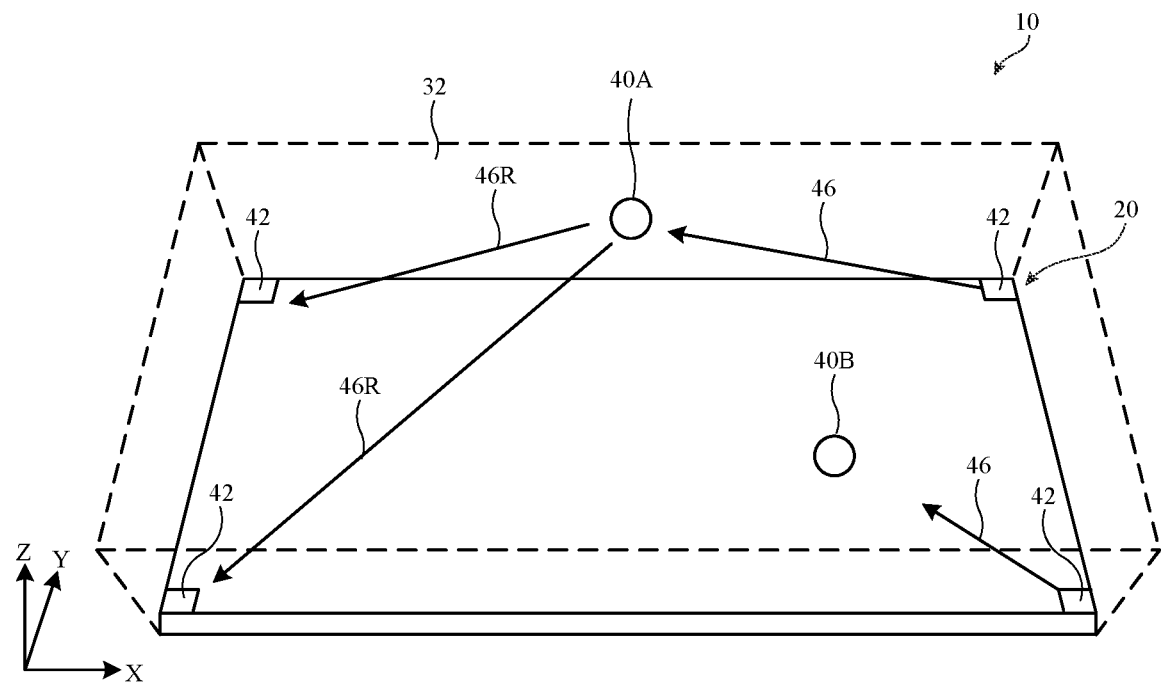
FIG. 7 is a perspective view of an illustrative electronic device with ultrasonic air input sensors for detecting air input in accordance with an embodiment.

FIG. 7 is a perspective view of device 10 in an illustrative configuration in which air input sensors are formed using ultrasonic transducers. As shown in FIG. 7, air input sensors 20 may include ultrasonic transducers 42 distributed at different locations around device 10. There may be any suitable number of ultrasonic transducers 42 in device 10 (e.g., one, two, three, four, five, six, ten, fifteen, twenty, more than twenty, less than twenty, etc.).

During operation, one or more of ultrasonic transducers 42 may be used to emit ultrasonic signals 46. The ultrasonic signals 46 may reflect off of object 40A (e.g., the user's hand, one or more fingers, a stylus, a pen, a paintbrush, and/or any other suitable object) in input region 32. One or more of ultrasonic transducers 42 may be used to detect ultrasonic signals 46R after the signals reflect off of object 40A in input region 32. Using time-of-flight measurement techniques, control circuitry 16 may determine the time that it takes for the emitted signal 46 to reflect back from object 40A, which may in turn be used to determine the position of object 40A in three-dimensional space (e.g., control circuitry 16 may determine the x, y, and z coordinates of object 40A at a given time based on emitted signals 46, based on reflected signals 46R, and based on the known positions of transducers 42 relative to one another). As object 40A moves within region 32, control circuitry 16 may continue to monitor changes in the position of object 40A using transducers 42.

If desired, the same transducer 42 may be used to emit and detect signals 46 (e.g., one or more of transducers 42 may be operable in a transmitting mode and a receiving mode). For example, transducers 42 may emit ultrasonic signal pulses during an emitting period and may subsequently be reconfigured as microphones during a listening period. Control circuitry 16 may cycle transducers 42 back and forth between emitting mode and listening mode (i.e., receiving mode). This is merely illustrative, however. If desired, some transducers 42 may be designated emitting transducers while other transducers 42 may be designated receiving transducers. During emitting mode, transducers 42 may emit ultrasonic signals at one or more different frequencies (e.g., ranging from 20 kHz to 340 kHz or other suitable frequencies). Transducers 42 may be piezoelectric micromachined ultrasonic transducers, capacitive micromachined ultrasonic transducers, and/or other suitable ultrasonic transducers. Transducers 42 may be fixed or may be steerable.

If desired, control circuitry 16 may use multiple transducers 42 to detect air input from multiple objects 40 in input zone 32 (e.g., simultaneously, if desired). As shown in FIG. 7, for example, objects 40A and 40B may be located in input region 32 at the same time. Due to the presence of multiple transducers 42, air input sensors 20 may detect air input from objects 40A and 40B at the same time. When signals 46 from a first transducer are unable to reach a first object such as object 40A due to the presence of a second object such as object 40B, signals 46 from a second transducer 42 may reach first object 40A unobstructed, thus allowing detection of both objects 40A and 40B at the same time.

Figure 8:
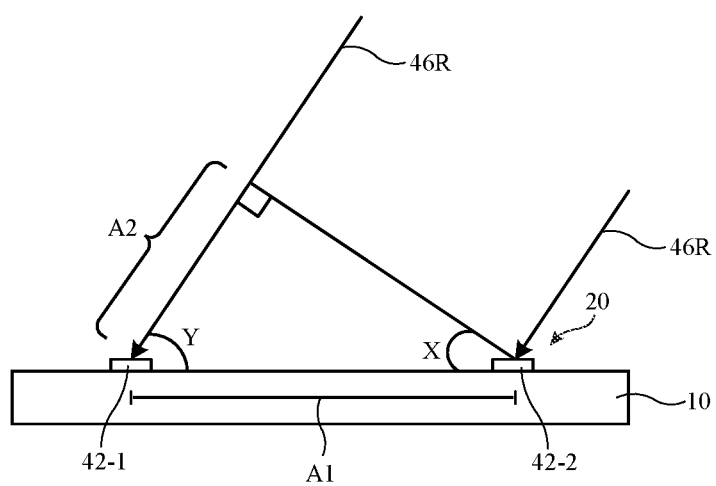
FIG. 8 is a side view of an illustrative electronic device having ultrasonic air input sensors that may be used to determine the angle of arrival of incoming acoustic waves in accordance with an embodiment.

FIG. 8 is a schematic diagram showing how angle of arrival (sometimes referred to as direction of arrival) measurement techniques may be used to determine the angle of arrival of incident ultrasonic signals. As shown in FIG. 8, air input sensors 20 may include multiple transducers 42 (e.g., a first transducer 42-1 and a second transducer 42-2). Transducers 42-1 and 42-2 may each receive an ultrasonic signal 46R after it reflects off of object 40 (FIG. 7). Transducers 42-1 and 42-2 may be laterally separated by a distance A1, where transducer 42-1 is farther away from object 40 than transducer 42-2 (in the example of FIG. 8). As such, ultrasonic signal 46R travels a greater distance to reach transducer 42-1 than it does to reach transducer 42-2. The additional distance between object 40 and transducer 42-1 is shown in FIG. 8 as distance A2. FIG. 8 also shows angles X and Y (where X+Y=90°).

Distance A2 may be determined as a function of angle Y or angle X (e.g., $A2=A1 \sin(X)$ or $A2=A1 \cos(Y)$). Distance A2 may also be determined as a function of the phase difference between the signal received by transducer 42-1 and the signal received by transducer 42-2 (e.g., $A2=(\Delta\phi\lambda)/(2\pi)$, where $\Delta\phi$ is the phase difference between the signal received by transducer 42-1 and the signal received by transducer 42-2 and $\lambda$ is the wavelength of the received signal 46R. Control circuitry 16 may include phase measurement circuitry coupled to each transducer 42 to measure the phase of the received signals and identify a difference in the phases ($\Delta\phi$). The two equations for A2 may be set equal to each other (e.g., $A1 \sin(X)=(\Delta\phi\lambda)/(2\pi)$) and rearranged to solve for angle X (e.g., $X=\sin^{-1}((\Delta\phi\lambda)/(2\pi A1))$) or may be rearranged to solve for angle Y. As such, the angle of arrival may be determined (e.g., by control circuitry 26) based on the known (predetermined) distance between transducer 42-1 and transducer 42-2, the detected (measured) phase difference between the signal received by transducer 42-1 and the signal received by transducer 42-2, and the known wavelength or frequency of the received signals 46. The wavelength $\lambda$ of signal 46R may be equal to the speed of sound in air divided by the frequency of the signal 46R.

The speed of sound is dependent upon characteristics of the medium that the sound is traveling through. If desired, control circuitry 16 may take into account atmospheric conditions such as altitude (e.g., relative to sea level) and/or air pressure when determining the speed of sound. For example, control circuitry 16 may obtain air pressure information and/or altitude information from one or more sensors in device 10, from one or more sensors in an external electronic device, and/or from an online database. Control circuitry 16 may determine the speed of sound for time-of-flight measurement purposes based on the air pressure information and/or altitude information. This is merely illustrative, however. If desired, control circuitry 16 may use a predetermined value for the speed of sound (e.g., the speed of sound in air).

If desired, transducers 42 may use an acoustic lens to diverge acoustic waves 46 emitted by transducer 42 over a range of angles and/or to focus acoustic waves 46R received over a range of angles onto transducer 42. This type of arrangement is illustrated in FIGS. 9 and 10.

Figure 9:
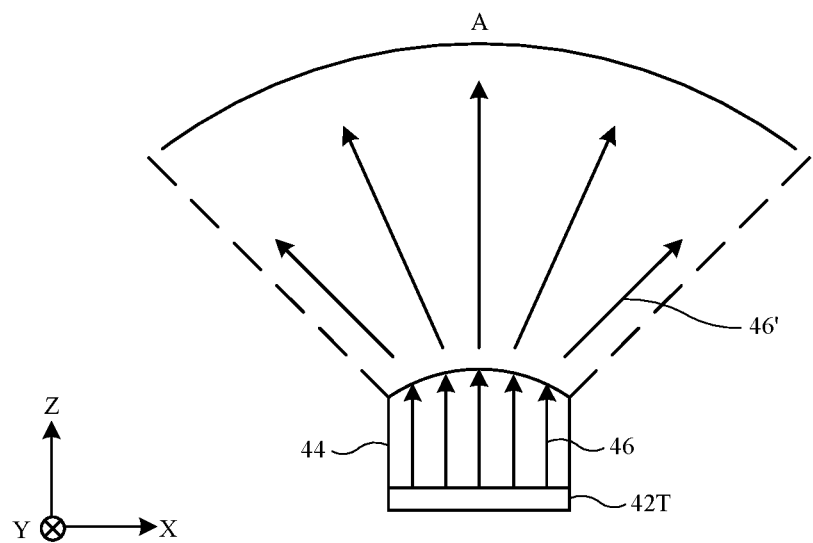
FIG. 9 is a cross-sectional side view of an illustrative ultrasonic transducer with an acoustic lens operating in transmitting mode in accordance with an embodiment.

In the example of FIG. 9, transducer 42T is operating in emitting mode. Acoustic lens 44 may be formed over transducer 42T. Acoustic lens 44 may be a microstructure (e.g., a coiled structure, a lattice structure, a labyrinth structure, etc.), a refractive-type convex acoustic lens, a planar acoustic lens that focuses acoustic waves by modulating the phase delay of the acoustic wave (e.g., Fresnel Zone Plate (FZP) lens), and/or any other suitable type of acoustic lens.

Transducer 42T may emit signals 46 initially directed vertically parallel to the z-axis of FIG. 9. Acoustic lens 44 may spread signals 46 out in multiple directions. Diverged signals 46' may spread out in the shape of a cone having angle A (sometimes referred to as transducer angle A). Diverged ultrasonic signals 46' may cover a larger volume of input region 32, thus allowing for detection of objects 40 in a volume of air that is reached by diverged signals 46' across angle A.

Figure 10:
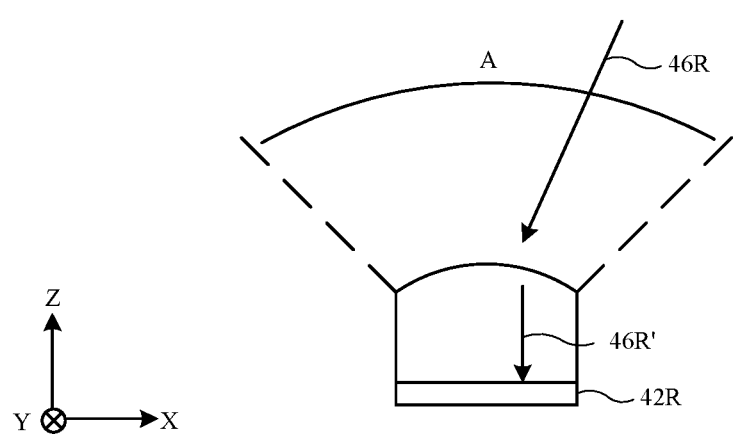
FIG. 10 is a cross-sectional side view of an illustrative ultrasonic transducer with an acoustic lens operating in receiving mode in accordance with an embodiment.

In the example of FIG. 10, transducer 42R is operating in receiving mode. Acoustic lens 44 may be formed over transducer 42R. Acoustic lens 44 may receive reflected ultrasonic signals 46R after signals 46R reflect off of object 40 in input region 32. Acoustic lens 44 may focus signals 46R onto transducer 42R. Focused signals 46R' may be redirected from the initial incident angle to an angle that focuses signals 46R' onto transducer 42R (e.g., focused signals 46R' may be parallel or nearly parallel to the z-axis of FIG. 10). The use of an acoustic lens is merely illustrative, however. If desired, air input sensors 20 may use ultrasonic transducers 42 without acoustic lenses.

Device 10 may gather and use personally identifiable information. It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The foregoing is merely illustrative and various modifications can be made to the described embodiments. The foregoing embodiments may be implemented individually or in any combination.

Table of Reference Numerals

| | | | |
|---|---|---|---|
| 10 | electronic device | 12 | input-output devices |
| 14 | display | 16 | control circuitry |
| 18 | sensors | 20 | air input sensors |
| 22, 22A, 22B | housing | 24 | keyboard |
| 26 | trackpad | 28 | rotational axis |
| 30 | directions | 32 | input region |
| 32A, 32B, 32C | input zones | 34 | visual elements |
| 40, 40A, 40B | objects | 42, 42-1, 42-2 | ultrasonic transducers |
| 44 | acoustic lens | 46, 46R, 46', 46R' | signals |
| H1 | height | D1, D2 | dimensions |

What is claimed is:

1. An electronic device having opposing front and rear faces, comprising:
    a housing;
    a display mounted to the housing on the front face;
    air input sensors configured to detect air input in a volume of air overlapping the front face, wherein the air input sensors include ultrasonic transducers located around a periphery of the display and wherein the ultrasonic transducers are configured to detect multi-finger hand gestures in the volume of air; and
    control circuitry configured to:
        control the display based on the air input;
        take a first type of action in response to the air input when the air input is at a first height relative to the front face, wherein the first action comprises moving a visual element over an object on the display; and
        take a second type of action in response to the air input when the air input is at a second height relative to the front face, wherein the second type of action comprises selecting the object on the display and wherein the second height is different from the first height.

2. The electronic device defined in claim 1 wherein the air input comprises air input from at least one finger of a user.

3. The electronic device defined in claim 2 wherein the control circuitry is configured to use the air input sensors to determine a height of the at least one finger relative to the front face.

4. The electronic device defined in claim 3 wherein the control circuitry is configured to use the display to display a visual feedback element based on the height.

5. The electronic device defined in claim 4 wherein the control circuitry is configured to adjust a characteristic of the visual feedback element on the display as the height changes.

6. The electronic device defined in claim 4 wherein the control circuitry is configured to darken the visual feedback element as the height decreases.

7. The electronic device defined in claim 1 wherein the ultrasonic transducers are operable in transmitting and receiving modes.

8. The electronic device defined in claim 7 wherein the ultrasonic transducers are configured to:
    emit ultrasonic signals towards the volume of air when operating in the transmitting mode; and
    detect the ultrasonic signals after the ultrasonic signals reflect from an object in the volume of air when operating in the receiving mode.

9. The electronic device defined in claim 8 wherein the control circuitry is configured to determine a location of the object using time-of-flight measurement techniques.

10. The electronic device defined in claim 1 wherein the control circuitry is configured to detect the air input based on movement of at least one of a finger and a stylus in the volume of air.

11. The electronic device defined in claim 1 wherein the visual element has a first characteristic at the first height and a second characteristic different from the first characteristic at the second height.

12. The electronic device defined in claim 1 wherein the housing comprises first and second housing portions configured to rotate relative to one another, the electronic device further comprising a keyboard in the second housing portion, wherein the ultrasonic transducers are mounted in the first and second housing portions.

13. The electronic device defined in claim 12 wherein the ultrasonic transducers each comprise an acoustic lens.

14. The electronic device defined in claim 12 wherein the air input comprises stylus input.

15. The electronic device defined in claim 1 wherein the volume of air in which the air input sensors are configured to detect the air input overlaps only a portion of the electronic device.

* * * * *